(12) United States Patent
Chen et al.

(10) Patent No.: US 12,016,064 B2
(45) Date of Patent: Jun. 18, 2024

(54) METHOD FOR ESTABLISHING HOTSPOT CONNECTION AND TERMINAL DEVICE

(71) Applicant: HUAWEI TECHNOLOGIES CO., LTD., Shenzhen (CN)

(72) Inventors: Jian Chen, Shanghai (CN); Jiaxin Li, Shanghai (CN); Ji Ding, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/467,980

(22) PCT Filed: Feb. 25, 2017

(86) PCT No.: PCT/CN2017/074886
§ 371 (c)(1),
(2) Date: Jun. 9, 2019

(87) PCT Pub. No.: WO2018/103206
PCT Pub. Date: Jun. 14, 2018

(65) Prior Publication Data
US 2020/0077456 A1    Mar. 5, 2020

(30) Foreign Application Priority Data
Dec. 9, 2016    (CN) .......................... 201611129944.4

(51) Int. Cl.
*H04W 76/14*    (2018.01)
*H04W 84/12*    (2009.01)
*H04W 88/04*    (2009.01)

(52) U.S. Cl.
CPC ............ *H04W 76/14* (2018.02); *H04W 84/12* (2013.01); *H04W 88/04* (2013.01)

(58) Field of Classification Search
None
See application file for complete search history.

(56) References Cited

U.S. PATENT DOCUMENTS 10,299,300 B1 *    5/2019    Young ................... H04W 76/11
2006/0117174 A1 *    6/2006    Lee ..................... H04L 41/0886
                                                                      713/154

(Continued)

FOREIGN PATENT DOCUMENTS

CN    101895962 A    11/2010
CN    103260256 A    8/2013

(Continued)

OTHER PUBLICATIONS

Second Chinese Office Action issued in corresponding Chinese Application No. 201780005526.0, dated Sep. 24, 2020, pp. 1-8, The State Intellectual Property Office of People's Republic of China, Beijing, China.

(Continued)

*Primary Examiner* — Kenny S Lin
*Assistant Examiner* — Rodrick Mak
(74) *Attorney, Agent, or Firm* — HAUPTMAN HAM, LLP

(57) ABSTRACT

Embodiments of the present invention relate to a method for establishing a hotspot connection and a terminal device. The method includes: sending, by a first terminal device, a request message to a second terminal device, where the request message is used to request that the first terminal device be used as a wireless local area network WLAN hotspot of the second terminal device; receiving, by the first terminal device, indication information from the second terminal device, where the indication information is used to indicate that the second terminal device confirms using the first terminal device as the WLAN hotspot of the second terminal device; and establishing, by the first terminal device serving as the WLAN hotspot of the second terminal device, a communication connection to the second terminal device.

16 Claims, 12 Drawing Sheets

(56) References Cited

U.S. PATENT DOCUMENTS

| | | | | |
|---|---|---|---|---|
| 2007/0141989 | A1* | 6/2007 | Flinchem | H04W 48/20 |
| | | | | 455/41.2 |
| 2010/0124196 | A1* | 5/2010 | Bonar | H04W 16/16 |
| | | | | 370/329 |
| 2010/0184377 | A1 | 7/2010 | Zilliacus et al. | |
| 2010/0281519 | A1* | 11/2010 | Das | H04L 63/062 |
| | | | | 726/3 |
| 2011/0028085 | A1* | 2/2011 | Waung | H04W 88/04 |
| | | | | 455/7 |
| 2011/0040867 | A1* | 2/2011 | Kalbag | H04L 67/02 |
| | | | | 709/224 |
| 2012/0240197 | A1* | 9/2012 | Tran | H04W 4/00 |
| | | | | 726/4 |
| 2013/0137368 | A1* | 5/2013 | Jiang | H04W 76/14 |
| | | | | 455/41.1 |
| 2013/0210379 | A1 | 8/2013 | Cloutier | |
| 2014/0007209 | A1 | 1/2014 | Zucker | |
| 2014/0195654 | A1* | 7/2014 | Kiukkonen | H04W 8/00 |
| | | | | 709/220 |
| 2014/0362728 | A1 | 12/2014 | Krochmal et al. | |
| 2015/0141067 | A1* | 5/2015 | Chien | G06Q 30/08 |
| | | | | 455/519 |
| 2015/0271678 | A1* | 9/2015 | Yaosaka | H04W 12/08 |
| | | | | 726/4 |
| 2016/0044586 | A1* | 2/2016 | Koskinen | H04W 72/53 |
| | | | | 370/336 |
| 2016/0071325 | A1* | 3/2016 | Callaghan | H04W 4/02 |
| | | | | 345/633 |
| 2016/0165644 | A1 | 6/2016 | Yang et al. | |
| 2016/0286344 | A1 | 9/2016 | Terashita | |
| 2016/0286588 | A1* | 9/2016 | Gulliksson | G06F 13/385 |
| 2016/0337892 | A1* | 11/2016 | Lo | H04L 5/0048 |
| 2016/0360466 | A1* | 12/2016 | Barak | H04W 76/10 |
| 2016/0381421 | A1* | 12/2016 | Inayatullah | H04N 21/4524 |
| | | | | 725/132 |
| 2017/0034329 | A1 | 2/2017 | Sakai | |
| 2017/0223088 | A1* | 8/2017 | Patel | H04W 4/08 |
| 2020/0187099 | A1* | 6/2020 | Ding | H04W 12/50 |

FOREIGN PATENT DOCUMENTS

| | | | |
|---|---|---|---|
| CN | 103826323 | A | 5/2014 |
| CN | 104488249 | A | 4/2015 |
| CN | 104754563 | A | 7/2015 |
| CN | 105376696 | A | 3/2016 |
| CN | 105554752 | A | 5/2016 |
| EP | 3007477 | A1 | 4/2016 |
| EP | 3255952 | A1 | 12/2017 |
| EP | 3503666 | A1 | 6/2019 |
| JP | 2015073231 | A | 4/2015 |
| JP | 2015076816 | A | 4/2015 |
| JP | 2015080192 | A | 4/2015 |
| JP | 2015510703 | A | 4/2015 |
| JP | 2015089114 | A | 5/2015 |
| JP | 2015522994 | A | 8/2015 |
| JP | 2016042656 | A | 3/2016 |
| JP | 2016076899 | A | 5/2016 |
| JP | 2016174347 | A | 9/2016 |
| JP | 2017034297 | A | 2/2017 |
| KR | 20140130501 | A | 11/2014 |
| KR | 20160023626 | A | 3/2016 |
| KR | 20160073242 | A | 6/2016 |
| KR | 20160085698 | A | 7/2016 |
| KR | 20160089270 | A | 7/2016 |
| WO | WO-2014135102 | A1 * | 9/2014 ......... H04W 74/004 |
| WO | 2014161277 | A1 | 10/2014 |
| WO | 2016125356 | A1 | 8/2016 |

OTHER PUBLICATIONS

Japanese Office Action issued in corresponding Japanese Application No. 2019-530698, dated Jul. 6, 2020, pp. 1-3.
Anonymous,"Share a mobile connection by tethering or hotspot on Pixel", Retrevied from internet on Aug. 29, 2019, https://support.google.com/pixelphone/answer/2812516?hl=en,total 3 pages.
Anonymous,"Get online with your Android phone", Retrevied from internet on Aug. 29, 2019:https://support.google.com/pixelbook/answer/7504779?hl=en,,total 3 pages.
Korean Notice of Allowance issued in corresponding Korean Application No. 9-5-2021-030160795, dated Apr. 15, 2021, pp. 1-2.
Chinese Office Action issued in corresponding Chinese Application No. 2019-530698, dated Feb. 1, 2021, pp. 1-4.
Korean Office Action issued in corresponding Korean Application No. 10-2022-7012325, dated Jul. 25, 2022, pp. 1-7.
Japanese Office Action issued in corresponding Japanese Application No. 2021-132752, dated Jul. 19, 2022, pp. 1-3.
Itceres et al.,"Connect wireless internet with Android smartphone Wi-Fi hotspot",2015. 5. 28,total:14 pages.
Chinese Notice of Allowance issued in corresponding Chinese Application No. 201611129944.4, dated Jan. 26, 2023, pp. 1-3.
Japanese Office Action issued in corresponding Japanese Application No. 2022-203632, dated Nov. 6, 2023, pp. 1-7.

* cited by examiner

METHOD FOR ESTABLISHING HOTSPOT CONNECTION AND TERMINAL DEVICE

CROSS-REFERENCE TO RELATED APPLICATIONS

This application is a national stage of International Application No. PCT/CN2017/074886, filed on Feb. 25, 2017, which claims priority to Chinese Patent Application No. 201611129944.4, filed on Dec. 9, 2016. Both of the aforementioned applications are hereby incorporated by reference in their entireties.

This application claims priority to Chinese Patent Application No. 201611129944.4, filed with the Chinese Patent Office of National Intellectual Property Administration on Dec. 9, 2016 and entitled "METHOD FOR ESTABLISHING HOTSPOT CONNECTION AND DEVICE", which is incorporated herein by reference in its entirety.

TECHNICAL FIELD

The present invention relates to the field of communications technologies, and in particular, to a method for establishing a hotspot connection and a terminal device.

BACKGROUND

A wireless local area network (Wireless Local Area Networks, WLAN) technology usually uses a 2.4 G ultrahigh frequency (Ultra High Frequency, UHF) or a 5 G super high frequency (Super High Frequency, SHF) industrial scientific & medical (Industrial Scientific Medical, ISM) radio frequency band. A WLAN hotspot is a dense-populated area in which Internet is provided by using a high-speed line. Radio waves in the area may be transmitted within a radius of tens of or one hundred meters from an access point. A terminal device supporting a WLAN technology may be connected to the WLAN hotspot only after a terminal device carries the terminal device to the area. In addition, the WLAN hotspot is usually protected by using a password, and the terminal device can be connected to the WLAM hotspot only after password authentication succeeds.

A WLAN hotspot initiator may alternatively be a terminal device. For example, a process in which a terminal device A shares a WLAN hotspot to a terminal device B is as follows: A user A turns on the WLAN hotspot on the terminal device A, and the user A or the terminal device A sets a password of the WLAN hotspot. A user B turns on a WLAN on the terminal device B, and the terminal device B scans surrounding WLAN hotspots. The user B selects a hotspot provided by the terminal device A from a list of scanned WLAN hotspots, enters the password for authentication. After authentication succeeds, the terminal device B is successfully connected to the WLAN hotspot of the terminal device A.

In conclusion, steps for connecting a terminal device to a WLAN hotspot are complex, and operations are relatively complicated. In addition, it is more inconvenient to connect a terminal device without a display screen or a keyboard to the WLAN hotspot.

SUMMARY

Embodiments of the present invention relate to a method for establishing a hotspot connection and a terminal device, to resolve prior-art problems that steps and operations for connecting a terminal device to a WLAN hotspot are relatively complicated and that it is inconvenient to connect a device without a display screen or a keyboard to a WLAN hotspot.

According to a first aspect, an embodiment of the present invention provides a method for establishing a hotspot connection. The method includes: sending, by a first terminal device, a request message to a second terminal device, where the request message is used to request that the first terminal device be used as a WLAN hotspot of the second terminal device; receiving, by the first terminal device, indication information from the second terminal device, where the indication information is used to indicate that the second terminal device confirms using the first terminal device as the WLAN hotspot of the second terminal device; and establishing, by the first terminal device serving as the WLAN hotspot of the second terminal device, a communication connection to the second terminal device.

Specifically, the method for establishing a hotspot connection provided in this embodiment of the present invention can simplify hotspot connection steps and improve efficiency of establishing a hotspot connection. In addition, the method can also resolve a problem that a hotspot receiver device without a big display screen or a keyboard cannot be connected to a WLAN hotspot of a surrounding terminal device, greatly improving user experience.

In an optional embodiment, the establishing, by the first terminal device serving as the WLAN hotspot of the second terminal device, a communication connection to the second terminal device includes: sending, by the first terminal device, WLAN hotspot connection information to the second terminal device, where the WLAN hotspot connection information includes a Medium Access Control MAC address and a password of the first terminal device; and establishing, by the first terminal device, a WLAN hotspot connection to the second terminal device based on the WLAN hotspot connection information.

In an optional embodiment, before the sending, by a first terminal device, a request message to a second terminal device, the method further includes: receiving, by the first terminal device, a first operation instruction of a user, where the first operation instruction is used to instruct the first terminal device to turn on the WLAN hotspot; and receiving, by the first terminal device, a second operation instruction of the user, where the second operation instruction is used to instruct the first terminal device to send the request message to the second terminal device.

Specifically, according to the method for establishing a hotspot connection provided in this embodiment of the present invention, the hotspot provider device proactively sends the request message to the surrounding device, to request to share the WLAN hotspot. The following operations can be skipped: The terminal device to be connected to the WLAN hotspot scans all surrounding WLAN hotspots, the user selects the WLAN hotspot on the terminal device, the user enters the WLAN hotspot password on the terminal device, and the like. This can simplify hotspot connection steps and improve efficiency of establishing a hotspot connection.

In an optional embodiment, before the receiving, by the first terminal device, a second operation instruction of the user, the method further includes: determining, by the first terminal device, a set of terminal devices that can use the first terminal device as the WLAN hotspot, where the set of terminal devices includes the second terminal device; and displaying, by the first terminal device, an identifier of at least one terminal device included in the set of terminal devices, so that the user enters the second operation instruction on the first terminal device based on the identifier of the at least one terminal device.

In an optional embodiment, the determining, by the first terminal device, a set of terminal devices that can use the first terminal device as the WLAN hotspot includes: broadcasting, by the first terminal device, a first broadcast frame, where the first broadcast frame is used to instruct a terminal device detecting the first broadcast frame to broadcast a second broadcast frame when the terminal device can use the first terminal device as the WLAN hotspot; scanning, by the first terminal device, the second broadcast frame; and determining, by the first terminal device based on the second broadcast frame, the set of terminal devices that can use the first terminal device as the WLAN hotspot.

In an optional embodiment, the determining, by the first terminal device, a set of terminal devices that can use the first terminal device as the WLAN hotspot includes: broadcasting, by the first terminal device, a first broadcast frame, where the first broadcast frame is used to instruct a terminal device detecting the first broadcast frame to broadcast a second broadcast frame, and the second broadcast frame carries indication information indicating whether the terminal device detecting the first broadcast frame can use the first terminal device as the WLAN hotspot; scanning, by the first terminal device, the second broadcast frame; and determining, by the first terminal device based on the second broadcast frame, the set of terminal devices that can use the first terminal device as the WLAN hotspot.

Specifically, the terminal device that can use the first terminal device as the WLAN hotspot may broadcast the second broadcast frame, so that the first terminal device determines the set of terminal devices that can use the first terminal device as the WLAN hotspot. Alternatively, the second broadcast frame broadcast by the terminal device may carry the indication information indicating whether the terminal device can use the first terminal device as the WLAN hotspot, so that the first terminal device determines the set of terminal devices that can use the first terminal device as the WLAN hotspot. This may be designed according to an actual requirement, and is not limited in the present invention.

In an optional embodiment, the first broadcast frame is a basic rate (Basic Rate, BR) technology-based broadcast frame or a Bluetooth low energy (Bluetooth Low Energy, BLE) technology-based broadcast frame.

According to a second aspect, an embodiment of the present invention provides another method for establishing a hotspot connection. The method includes: receiving, by a first terminal device, a request message from a second terminal device, where the request message is used to request that the second terminal device be used as a WLAN hotspot of the first terminal device; sending, by the first terminal device, indication information to the second terminal device, where the indication information is used to indicate that the first terminal device confirms using the second terminal device as the WLAN hotspot of the first terminal device; and establishing, by the first terminal device, a communication connection to the second terminal device by using the second terminal device as the WLAN hotspot.

In an optional embodiment, the establishing, by the first terminal device, a communication connection to the second terminal device by using the second terminal device as the WLAN hotspot includes: receiving, by the first terminal device, WLAN hotspot connection information from the second terminal device, where the WLAN hotspot connection information includes a Medium Access Control MAC address and a password of the WLAN hotspot; and establishing, by the first terminal device, a WLAN hotspot connection to the second terminal device based on the WLAN hotspot connection information.

In an optional embodiment, the first terminal device displays the request message of the second terminal device; and before the sending, by the first terminal device, indication information to the second terminal device, the method further includes: receiving, by the first terminal device, a first operation instruction of a user, where the first operation instruction is used to instruct the first terminal device to send the indication information to the second terminal device.

Specifically, according to the method for establishing a hotspot connection provided in this embodiment of the present invention, the following operations can be skipped: The terminal device to be connected to the WLAN hotspot scans all surrounding WLAN hotspots, the user selects the WLAN hotspot on the terminal device, the user enters the WLAN hotspot password on the terminal device, and the like. This can simplify hotspot connection steps and improve efficiency of establishing a hotspot connection.

In an optional embodiment, before the receiving, by a first terminal device, a request message from a second terminal device, the method further includes: scanning, by the first terminal device, a first broadcast frame from the second terminal device, where the first broadcast frame is used to instruct a terminal device detecting the first broadcast frame to broadcast a second broadcast frame when the terminal device can use the second terminal device as the WLAN hotspot; determining, by the first terminal device, that the second terminal device can be used as the WLAN hotspot; and broadcasting, by the first terminal device, the second broadcast frame.

In an optional embodiment, before the receiving, by a first terminal device, a request message from a second terminal device, the method further includes: scanning, by the first terminal device, a first broadcast frame from the second terminal device, where the first broadcast frame is used to instruct a terminal device detecting the first broadcast frame to broadcast a second broadcast frame, and the second broadcast frame carries indication information indicating whether the terminal device detecting the first broadcast frame can use the second terminal device as the WLAN hotspot; and broadcasting, by the first terminal device, the second broadcast frame, where the second broadcast frame carries indication information indicating whether the first terminal device can use the second terminal device as the WLAN hotspot.

In an optional embodiment, the first broadcast frame is a BR technology-based broadcast frame or a BLE technology-based broadcast frame.

According to a third aspect, an embodiment of the present invention provides a terminal device. The terminal device is a first terminal device, and the first terminal device includes a memory, a processor, and a wireless communications interface. The memory is configured to store a program instruction. The processor is configured to perform the following operations according to the program instruction stored in the memory: instructing the wireless communications interface to send a request message to a second terminal device, where the request message is used to request that the first terminal device be used as a WLAN hotspot of the second terminal device; instructing the wireless communications interface to receive indication information from the second terminal device, where the indication information is used to indicate that the second terminal device confirms using the first terminal device as the WLAN hotspot of the second terminal device; and instructing the wireless communications interface to establish a communication connection to the second terminal device by using the first terminal device as the WLAN hotspot of the second terminal device.

For example, the wireless communications interface may be a Bluetooth module or a WLAN module.

In an optional embodiment, the processor is further configured to perform the following operation according to the program instruction stored in the memory: instructing the wireless communications interface to send WLAN hotspot connection information to the second terminal device, where the WLAN hotspot connection information is used to establish the communication connection to the first terminal device by the second terminal device by using the first terminal device as the WLAN hotspot.

In an optional embodiment, the first terminal device further includes an input unit. The processor is further configured to perform the following operation according to the program instruction stored in the memory: instructing the input unit to receive a first operation instruction of a user, where the first operation instruction is used to instruct the processor to turn on the WLAN hotspot. The input unit is further configured to receive a second operation instruction of the user, where the second operation instruction is used to instruct the processor to control the wireless communications interface to send the request message to the second terminal device.

In an optional embodiment, the first terminal device further includes a display unit. The processor is further configured to perform the following operations according to the program instruction stored in the memory: determining a set of terminal devices that can use the wireless communications interface as the WLAN hotspot, where the set of terminal devices includes the second terminal device; and instructing the display unit to display an identifier of at least one terminal device included in the set of terminal devices, so that the user enters the second operation instruction on the input unit based on the identifier of the at least one terminal device.

In an optional embodiment, the processor is further configured to perform the following operations according to the program instruction stored in the memory: instructing the wireless communications interface to broadcast a first broadcast frame, where the first broadcast frame is used to instruct a terminal device detecting the first broadcast frame to broadcast a second broadcast frame when the terminal device can use the wireless communications interface as the WLAN hotspot; scanning the second broadcast frame; and determining, based on the second broadcast frame, the set of terminal devices that can use the first terminal device as the WLAN hotspot.

In an optional embodiment, the processor is further configured to perform the following operations according to the program instruction stored in the memory: instructing the wireless communications interface to broadcast a first broadcast frame, where the first broadcast frame is used to instruct a terminal device detecting the first broadcast frame to broadcast a second broadcast frame, and the second broadcast frame carries indication information indicating whether the terminal device detecting the first broadcast frame can use the first terminal device as the WLAN hotspot; instructing the wireless communications interface to scan the second broadcast frame; and determining, based on the second broadcast frame, the set of terminal devices that can use the first terminal device as the WLAN hotspot.

In an optional embodiment, the processor is specifically configured to perform the following operation according to the program instruction stored in the memory: instructing the wireless communications interface to broadcast the first broadcast frame based on a basic rate BR technology or broadcast the first broadcast frame based on a Bluetooth low energy BLE technology.

According to a fourth aspect, an embodiment of the present invention provides another terminal device. The terminal device is a first terminal device, and the first terminal device includes a memory, a processor, and a wireless communications interface. The memory is configured to store a program instruction. The processor is configured to perform the following operations according to the program instruction stored in the memory: instructing the wireless communications interface to receive a request message from a second terminal device, where the request message is used to request that the second terminal device be used as a WLAN hotspot of the first terminal device; instructing the wireless communications interface to send indication information to the second terminal device, where the indication information is used to indicate that the first terminal device confirms using the second terminal device as the WLAN hotspot of the first terminal device; and instructing the wireless communications interface to establish a communication connection to the second terminal device by using the second terminal device as the WLAN hotspot of the first terminal device.

For example, the wireless communications interface may be a Bluetooth module or a WLAN module.

In an optional embodiment, the processor is further configured to perform the following operations according to the program instruction stored in the memory: instructing the wireless communications interface to receive WLAN hotspot connection information from the second terminal device; and instructing the wireless communications interface to establish the communication connection to the second terminal device based on the WLAN hotspot connection information by using the second terminal device as the WLAN hotspot.

In an optional embodiment, the first terminal device further includes a display unit and an input unit. The processor is further configured to perform the following operations according to the program instruction stored in the memory: instructing the display unit to display the request message of the second terminal device; and instructing the input unit to receive a first operation instruction of a user, where the first operation instruction is used to instruct the processor to control the wireless communications interface to send the indication information to the second terminal device.

In an optional embodiment, the processor is further configured to perform the following operations according to the program instruction stored in the memory: instructing the wireless communications interface to scan a first broadcast frame from the second terminal device, where the first broadcast frame is used to instruct a terminal device detecting the first broadcast frame to broadcast a second broadcast frame when the terminal device can use the second terminal device as the WLAN hotspot; determining that the first terminal device can use the second terminal device as the WLAN hotspot; and instructing the wireless communications interface to broadcast the second broadcast frame.

In an optional embodiment, the processor is further configured to perform the following operations according to the program instruction stored in the memory: instructing the wireless communications interface to scan a first broadcast frame from the second terminal device, where the first broadcast frame is used to instruct a terminal device detecting the first broadcast frame to broadcast a second broadcast frame, and the second broadcast frame carries indication information indicating whether the terminal device detecting the first broadcast frame can use the second terminal device as the WLAN hotspot; and instructing the wireless communications interface to broadcast the second broadcast frame, where the second broadcast frame carries indication information indicating whether the first terminal device can use the second terminal device as the WLAN hotspot.

In an optional embodiment, the processor is specifically configured to perform the following operation according to the program instruction stored in the memory: instructing the wireless communications interface to be specifically configured to scan the first broadcast frame based on a basic rate BR technology or scan the first broadcast frame based on a Bluetooth low energy BLE technology.

According to a fifth aspect, an embodiment of the present invention provides another terminal device. The terminal device is a first terminal device, and the first terminal device includes a wireless communications unit, configured to send a request message to a second terminal device, where the request message is used to request that the first terminal device be used as a WLAN hotspot of the second terminal device. The wireless communications unit is further configured to receive indication information from the second terminal device, where the indication information is used to indicate that the second terminal device confirms using the first terminal device as the WLAN hotspot of the second terminal device. The wireless communications unit is further configured to establish a communication connection to the second terminal device by using the first terminal device as the WLAN hotspot of the second terminal device.

In an optional embodiment, the wireless communications unit is specifically configured to send WLAN hotspot connection information to the second terminal device, where the WLAN hotspot connection information is used to establish the communication connection to the first terminal device by the second terminal device by using the first terminal device as the WLAN hotspot.

In an optional embodiment, the first terminal device further includes a receiving unit, configured to receive a first operation instruction of a user, where the first operation instruction is used to instruct the wireless communications unit to turn on the WLAN hotspot. The receiving unit is further configured to receive a second operation instruction of the user, where the second operation instruction is used to instruct the wireless communications unit to send the request message to the second terminal device.

In an optional embodiment, the first terminal device further includes a determining unit, configured to determine a set of terminal devices that can use the wireless communications unit as the WLAN hotspot, where the set of terminal devices includes the second terminal device; and a display unit, configured to display an identifier of at least one terminal device included in the set of terminal devices, so that the user enters the second operation instruction on the receiving unit based on the identifier of the at least one terminal device.

In an optional embodiment, the wireless communications unit is further configured to: broadcast a first broadcast frame, where the first broadcast frame is used to instruct a terminal device detecting the first broadcast frame to broadcast a second broadcast frame when the terminal device can use the first terminal device as the WLAN hotspot; and scan the second broadcast frame. The determining unit is specifically configured to determine, based on the second broadcast frame, the set of terminal devices that can use the first terminal device as the WLAN hotspot.

In an optional embodiment, the wireless communications unit is further configured to: broadcast a first broadcast frame, where the first broadcast frame is used to instruct a terminal device detecting the first broadcast frame to broadcast a second broadcast frame, and the second broadcast frame carries indication information indicating whether the terminal device detecting the first broadcast frame can use the first terminal device as the WLAN hotspot; and scan the second broadcast frame. The determining unit is specifically configured to determine, based on the second broadcast frame, the set of terminal devices that can use the first terminal device as the WLAN hotspot.

In an optional embodiment, the wireless communications unit is specifically configured to broadcast the first broadcast frame based on a basic rate BR technology or broadcast the first broadcast frame based on a Bluetooth low energy BLE technology.

According to a sixth aspect, an embodiment of the present invention provides another terminal device. The terminal device is a first terminal device, and the first terminal device includes a wireless communications unit, configured to receive a request message from a second terminal device, where the request message is used to request that the second terminal device be used as a WLAN hotspot of the first terminal device. The wireless communications unit is further configured to send indication information to the second terminal device, where the indication information is used to indicate that the first terminal device confirms using the second terminal device as the WLAN hotspot of the first terminal device. The wireless communications unit is further configured to establish a communication connection to the second terminal device by using the second terminal device as the WLAN hotspot of the first terminal device.

In an optional embodiment, the wireless communications unit is further configured to receive WLAN hotspot connection information from the second terminal device. The wireless communications unit is specifically configured to establish the communication connection to the second terminal device based on the WLAN hotspot connection information by using the second terminal device as the WLAN hotspot of the first terminal device.

In an optional embodiment, the first terminal device further includes a display unit, configured to display the request message of the second terminal device; and a receiving unit, configured to receive a first operation instruction of a user, where the first operation instruction is used to instruct the wireless communications unit to send the indication information to the second terminal device.

In an optional embodiment, the first terminal device further includes a determining unit. The wireless communications unit is further configured to scan a first broadcast frame from the second terminal device, where the first broadcast frame is used to instruct a terminal device detecting the first broadcast frame to broadcast a second broadcast frame when the terminal device can use the second terminal device as the WLAN hotspot. The determining unit is configured to determine that the first terminal device can use the second terminal device as the WLAN hotspot. The wireless communications unit is further configured to broadcast the second broadcast frame.

In an optional embodiment, the wireless communications unit is further configured to scan a first broadcast frame from the second terminal device, where the first broadcast frame is used to instruct a terminal device detecting the first broadcast frame to broadcast a second broadcast frame, and the second broadcast frame carries indication information indicating whether the terminal device detecting the first broadcast frame can use the second terminal device as the WLAN hotspot. The wireless communications unit is further configured to broadcast the second broadcast frame, where the second broadcast frame carries indication information indicating whether the first terminal device can use the second terminal device as the WLAN hotspot.

In an optional embodiment, the wireless communications unit of the first terminal device is specifically configured to broadcast the first broadcast frame based on a basic rate BR technology or broadcast the first broadcast frame based on a Bluetooth low energy BLE technology.

Based on the foregoing technical solutions, the method for establishing a hotspot connection and the terminal device provided in the embodiments of the present invention simplify hotspot connection steps and improve efficiency of establishing a hotspot connection. Further, the method and the terminal device can also resolve a problem that a hotspot receiver device without a big display screen or a keyboard cannot be connected to a WLAN hotspot of a surrounding terminal device, greatly improving user experience.

DESCRIPTION OF EMBODIMENTS

The following describes the technical solutions in the embodiments of the present invention with reference to the accompanying drawings in the embodiments of the present invention.

A network architecture and a service scenario described in the embodiments of the present invention are intended to describe the technical solutions in the embodiments of the present invention more clearly, and do not constitute a limitation on the technical solutions provided in the embodiments of the present invention. A person of ordinary skill in the art may understand that with evolution of a network architecture and emergence of a new service scenario, the technical solutions provided in the embodiments of the present invention are also applicable to a similar technical problem.

Ordinal numbers such as "first" and "second", when mentioned in the embodiments of the present invention, are used only for distinguishing, unless the ordinal numbers definitely represent an order according to the context.

Figure 1:
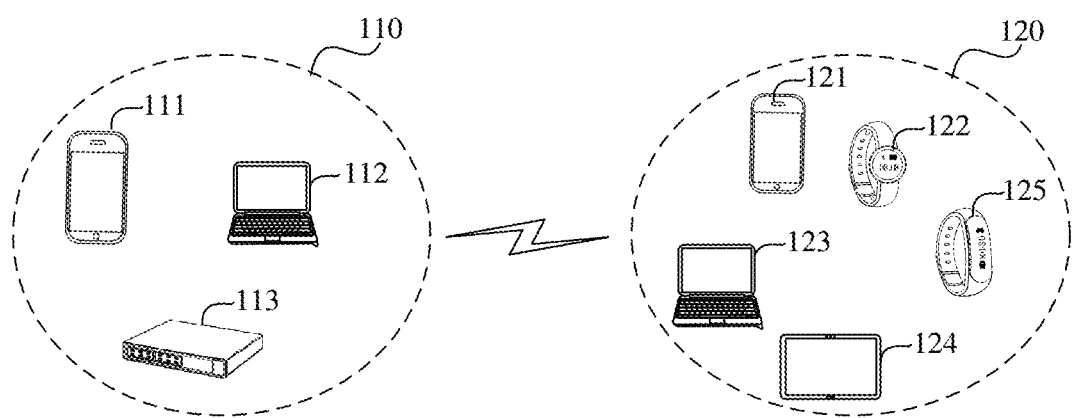
FIG. 1 is a schematic architectural diagram of a communications system according to an embodiment of the present invention.

FIG. 1 is a schematic architectural diagram of a communications system according to an embodiment of the present invention. As shown in FIG. 1, the communications system includes a terminal device 110 and a terminal device 120.

The terminal devices used in this application may include a device with a wireless communication function such as a handheld device, an in-vehicle device, a wearable device (wearable device, WD), a computing device, or another processing device connected to a wireless modem, and a device in various forms such as a mobile station (mobile station, MS), a terminal (terminal), a terminal device (terminal equipment), or the like.

In a possible embodiment, one of the terminal device 110 and the terminal device 120 may be referred to as a hotspot provider device and the other one may be referred to as a hotspot receiver device. In this embodiment of the present invention, the terminal device 110 being the hotspot provider device is used as an example to describe the communications system and the method for establishing a hotspot connection provided in this embodiment of the present invention.

More specifically, when the terminal device 110 is the hotspot provider device, the terminal device 110 may be a device that can be used as a WLAN hotspot, such as a mobile phone 111, a computer 112, or a wireless router or switch 113. When the terminal device 120 is the hotspot receiver device, the terminal device 120 may be a handheld device, a WD, or another device that can be connected to a WLAN hotspot, such as a mobile phone 121, a smartwatch 122, a notebook computer 123, a tablet computer 124, or a smart band 125.

In the communications system shown in FIG. 1, the terminal device 110 determines to turn on a WLAN hotspot, and the terminal device 110 performs broadcasting and scanning by using a wireless communications technology, to discover a set of surrounding terminal devices that can use the terminal device 110 as the WLAN hotspot. The set of terminal devices includes the terminal device 120. The terminal device 110 determines to share the WLAN hotspot to the terminal device 120. The terminal device 110 sends a request message to the terminal device 120 by using a wireless communications technology. The request message is used to request that the terminal device 110 be used as the WLAN hotspot of the terminal device 120. The terminal device 120 receives the request message sent by the terminal device 110, and sends indication information to the terminal device 110. The indication information is used to indicate that the terminal device 120 confirms using the terminal device 110 as the WLAN hotspot of the terminal device 120, that is, the terminal device 120 agrees to connect to the WLAN hotspot of the terminal device 110. The terminal device 110 sends WLAN hotspot connection information to the terminal device 120 by using a wireless communications technology, and the terminal device 120 establishes a hotspot connection to the terminal device 110 based on the WLAN hotspot connection information.

For example, the wireless communications technology may be a Bluetooth (Bluetooth) technology, a WLAN technology, or another wireless communications technology such as near field communication (Near Field Communication, NFC) or a ZigBee (ZigBee) protocol.

In a possible example, that the terminal device 120 establishes the hotspot connection to the terminal device 110 means that the terminal device 120 uses the terminal device 110 as the WLAN hotspot or a routing node to connect to the Internet. For example, when the terminal device 110 is a mobile phone, the terminal device 120 uses the terminal device 110 as the WLAN hotspot to connect to the Internet by using a 3G/4G wireless network. For another example, when the terminal device 110 is a notebook computer, the terminal device 120 uses the terminal device 110 as the WLAN hotspot to connect to the Internet by using a wired network.

For example, the terminal device 110 may receive a user operation to trigger turning on of the WLAN hotspot. After discovering a surrounding terminal device that can use the terminal device 110 as the WLAN hotspot, the terminal device 110 may select, according to a user operation, the terminal device 120 to which the WLAN hotspot is shared, to trigger the terminal device 110 to send a request message to the corresponding terminal device 120. After receiving the request message of the terminal device 110, the terminal device 120 may receive a user operation to determine whether to agree to connect to the WLAN hotspot of the terminal device 110. For details, refer to schematic diagrams of a terminal device screen and user operations shown in FIG. 2 to FIG. 8.

For example, a user may select a plurality of terminal devices to share the WLAN hotspot, and correspondingly, the terminal device 110 sends the request message to the plurality of terminal devices.

For example, after the terminal device 120 establishes the hotspot connection to the terminal device 110, the terminal device 120 may connect to the Internet by using the WLAN hotspot of the terminal device 110.

In the communications system provided in this embodiment of the present invention, the hotspot provider device can discover a surrounding hotspot receiver device within a short time (for example, 1s). After selecting a hotspot receiver device, the hotspot provider device can establish a hotspot connection within a short time (for example, 2s).

Correspondingly, FIG. 2 to FIG. 8 are schematic diagrams of terminal screens corresponding to the method for establishing a hotspot connection according to an embodiment of the present invention.

Figure 2:
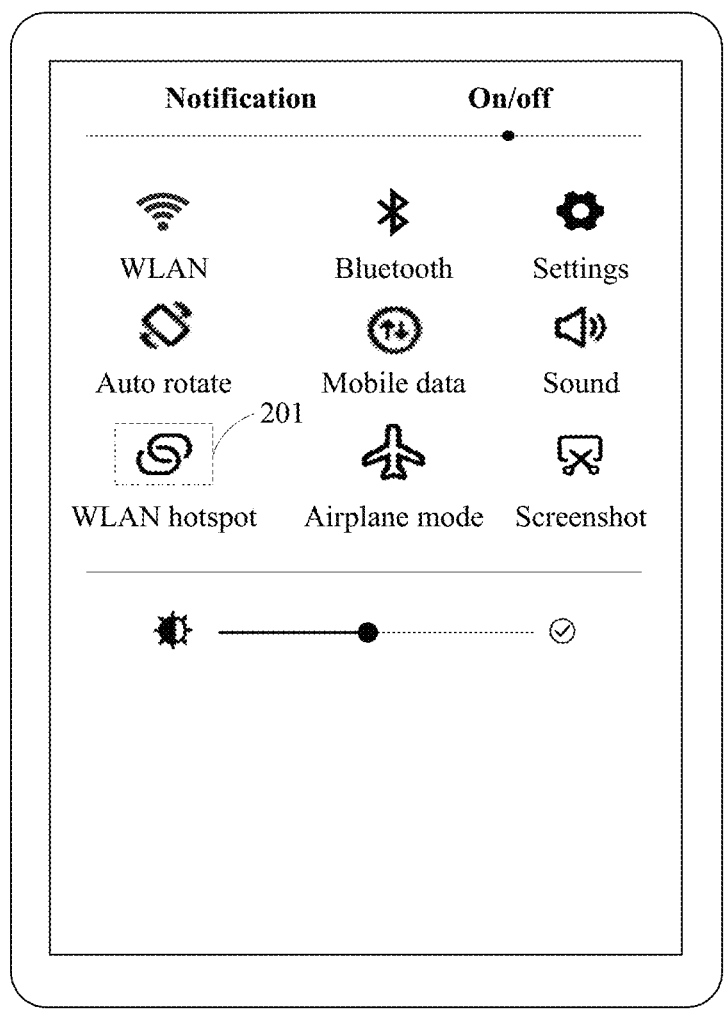
FIG. 2 is a schematic diagram of a first terminal screen corresponding to a method for establishing a hotspot connection according to an embodiment of the present invention.

As shown in FIG. 2, a plurality of function option icons may be displayed on an "on/off" screen of the terminal device 110, and a user may select an icon by using an input key or in a manner of touching. As shown in FIG. 2, if the user selects "WLAN", it indicates that the terminal device 110 is instructed to turn on a WLAN to search for and connect to a surrounding WLAN hotspot. If the user selects "Bluetooth", it indicates that a Bluetooth module function or the like is turned on. On the screen shown in FIG. 2, the user may select "WLAN hotspot", as shown by 201, to trigger the terminal device 10 to turn on a WLAN hotspot.

Figure 3:
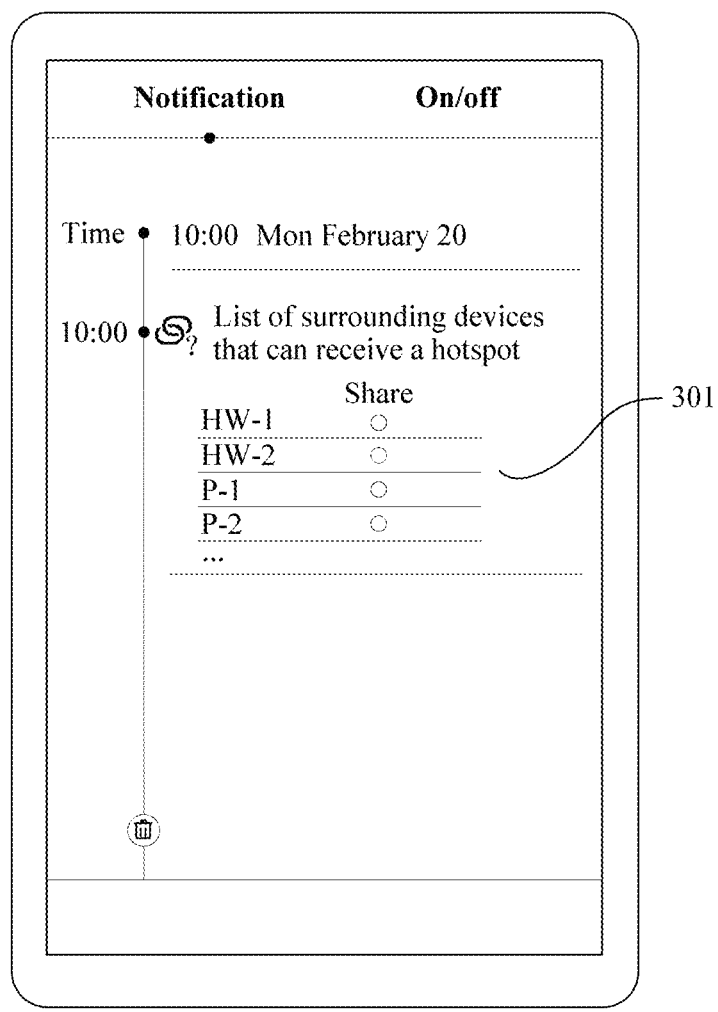
FIG. 3 is a schematic diagram of a second terminal screen corresponding to a method for establishing a hotspot connection according to an embodiment of the present invention.

As shown in FIG. 3, after receiving an instruction for turning on a WLAN hotspot, a WLAN module, a Bluetooth module, or another wireless communications module of the terminal device 110 discovers, by performing broadcasting and scanning, a set of terminal devices that can use the terminal device 110 as the WLAN hotspot. The terminal device 110 uses an identifier of at least one terminal device included in the set of terminal devices as a list of surrounding devices that can receive the hotspot, and instructs a display screen to display, to the user by using a "notification" screen, the list of surrounding devices that can receive the hotspot. As shown in 301, the list of surrounding devices that can receive the hotspot includes terminal devices such as "HW-1, HW-2, P-1, and P-2".

For example, the terminal device 110 may use wireless fidelity (wireless fidelity, Wi-Fi) broadcast and scanning technologies when performing broadcast and scanning by using the WLAN module.

For example, the terminal device 110 may use BR or BLE broadcast and scanning technologies when performing broadcast and scanning by using the Bluetooth module.

Figure 4:
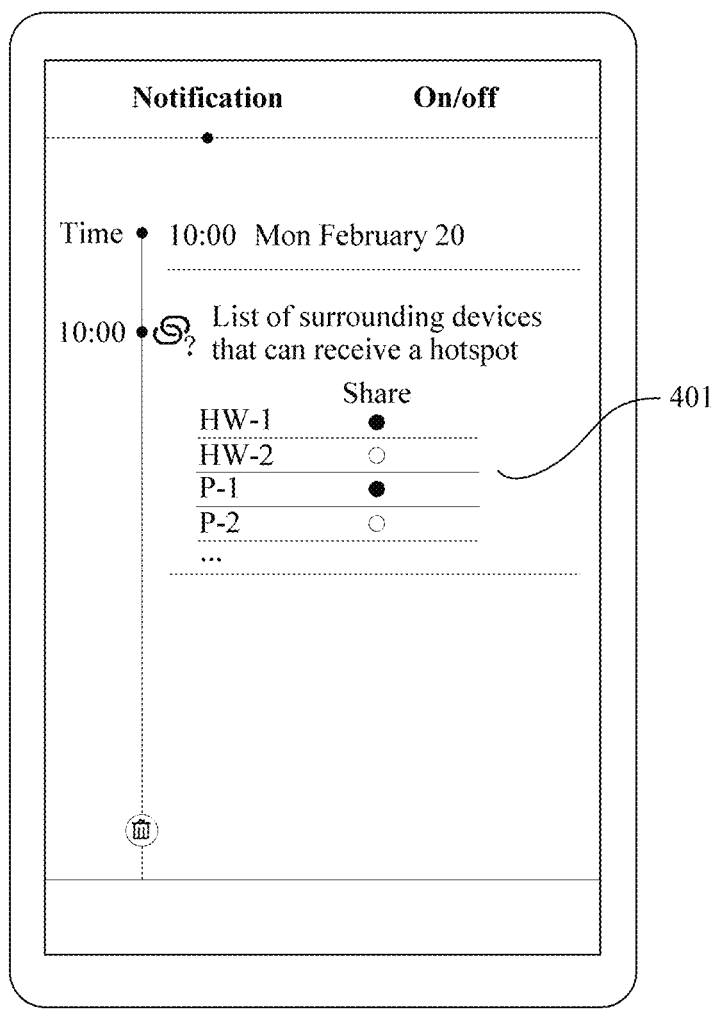
FIG. 4 is a schematic diagram of a third terminal screen corresponding to a method for establishing a hotspot connection according to an embodiment of the present invention.

As shown in FIG. 4, the user may select at least one terminal device from the list shown in 301 to send the request message. As shown in 401, the user chooses an icon "◦" in FIG. 4 to select a corresponding terminal device to share the WLAN hotspot. As shown in 401, the user selects terminal devices such as "HW-1" and "P-1". The WLAN module, the Bluetooth module, or the another wireless communications module of the terminal device 110 sends the request message to the terminal devices such as "HW-1" and "P-1".

It should be understood that the terminal devices such as "HW-1" and "P-1" that share the WLAN hotspot and that are selected by the user may be understood as the terminal device 120.

Figure 5:
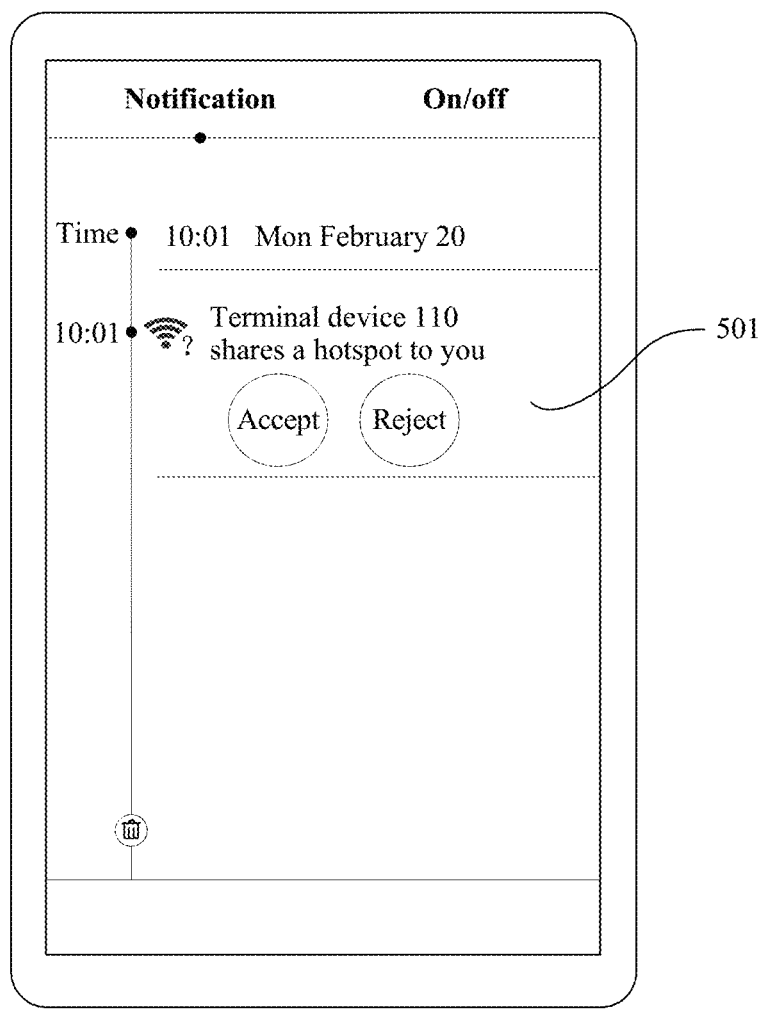
FIG. 5 is a schematic diagram of a fourth terminal screen corresponding to a method for establishing a hotspot connection according to an embodiment of the present invention.

As shown in FIG. 5, a WLAN module, a Bluetooth module, or another wireless communications module of the terminal device 120 receives the request message sent by the terminal device 110, and instructs a display screen to display the hotspot sharing request to the user on a "notification" screen. As shown by 501, the display interface of the terminal device 120 displays "the terminal device 110 shares a hotspot to you", and prompts the user to select "accept" or "reject".

Figure 6:
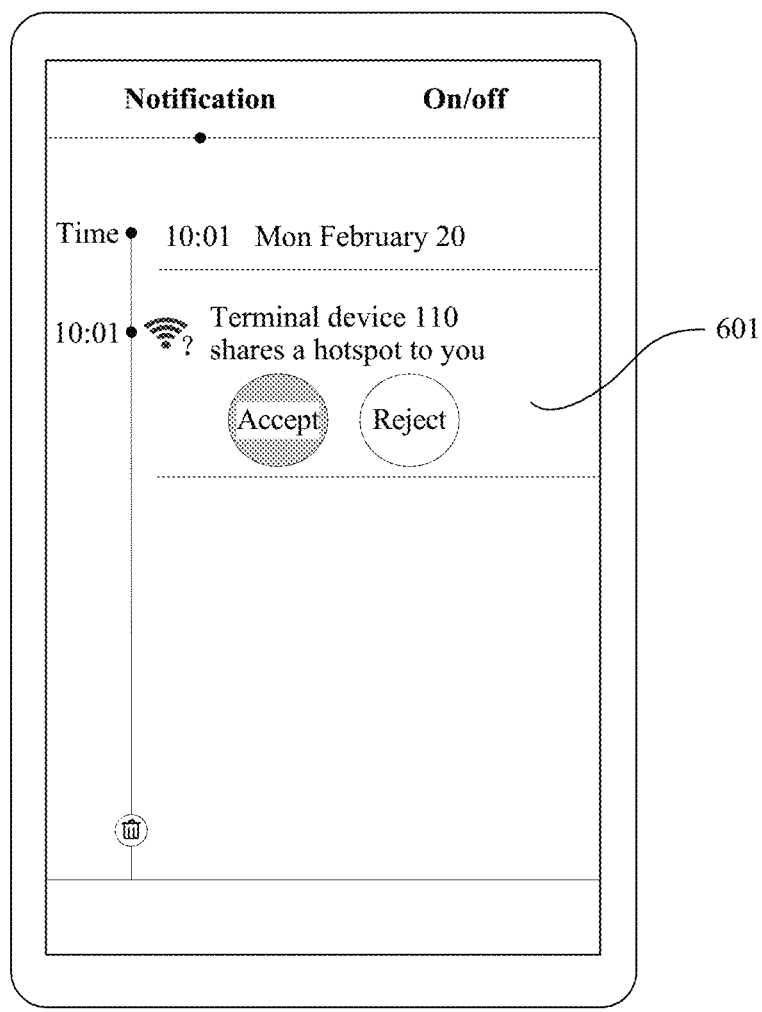
FIG. 6 is a schematic diagram of a fifth terminal screen corresponding to a method for establishing a hotspot connection according to an embodiment of the present invention.

As shown in FIG. 6, the user may accept or reject the hotspot sharing request of the terminal device 110 by using a touchscreen or a key or in another manner. Usually, when the terminal device includes a touchscreen, a display screen of the terminal device is integrated with the touchscreen, and is not individually shown in FIG. 2 to FIG. 8. As shown by 601, the user selects "accept" to trigger the WLAN module, the Bluetooth module, or the another wireless communications module to send indication information to the terminal device 110. The indication information indicates that the terminal device 120 agrees to connect to the WLAN hotspot of the terminal device 110.

Figure 7:
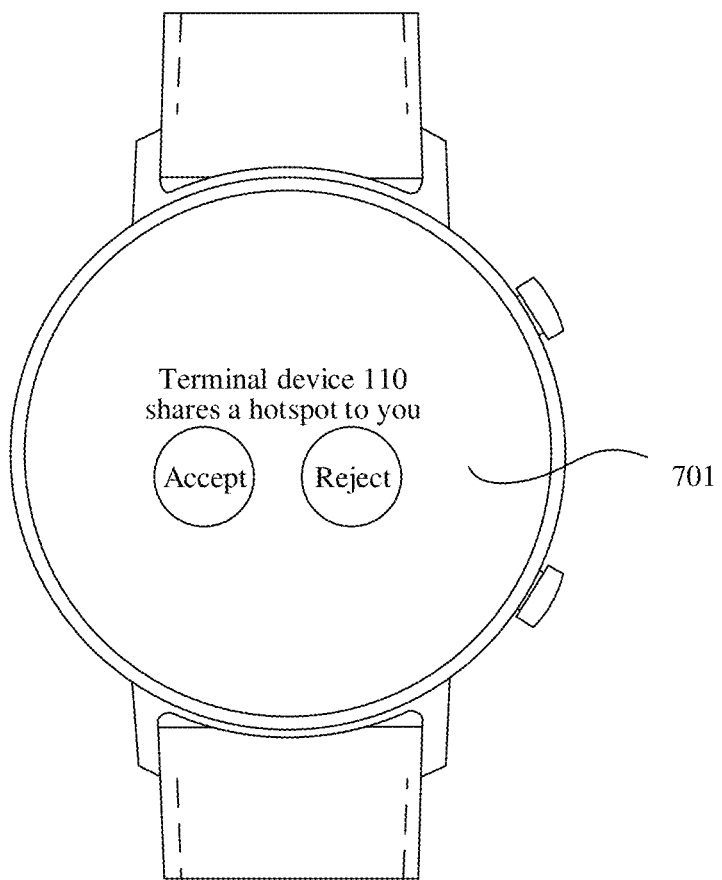
FIG. 7 is a schematic diagram of a sixth terminal screen corresponding to a method for establishing a hotspot connection according to an embodiment of the present invention.
Figure 8:
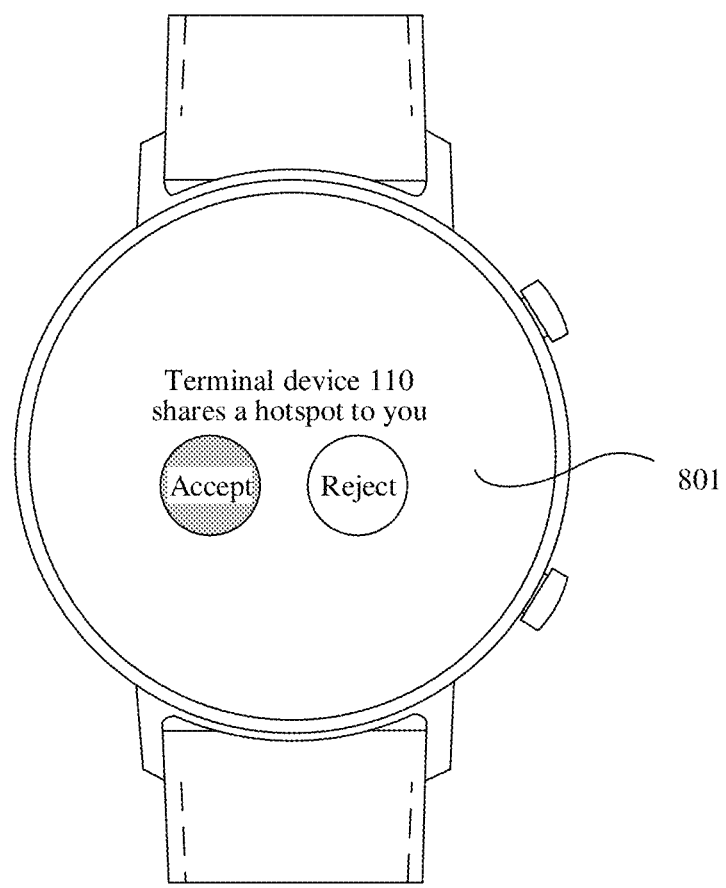
FIG. 8 is a schematic diagram of a seventh terminal screen corresponding to a method for establishing a hotspot connection according to an embodiment of the present invention.

It should be understood that the terminal device 120 may be a device having a relatively large display screen, such as a mobile phone, a tablet computer, or a notebook computer. In addition, the terminal device 120 may alternatively be a device having a relatively small display screen, such as a smartwatch or another WD. FIG. 7 schematically shows a schematic screen when the terminal device 120 being the smartwatch receives the request message. Correspondingly, FIG. 8 schematically shows a schematic screen of selecting, by the user by using a touchscreen or a key or in another manner, to "accept" the request of the terminal device 110 when the terminal device 120 is the smartwatch.

The schematic diagrams of the terminal screens, shown in FIG. 2 to FIG. 8, corresponding to the method for establishing a hotspot connection are merely presentation manners of the embodiments of the present invention, and do not constitute any limitation on the embodiments of the present invention. A person skilled in the art may implement the solution of this embodiment of the present invention in another displaying or indication manner of a terminal screen based on the method or idea provided in this embodiment of the present invention.

Figure 9:
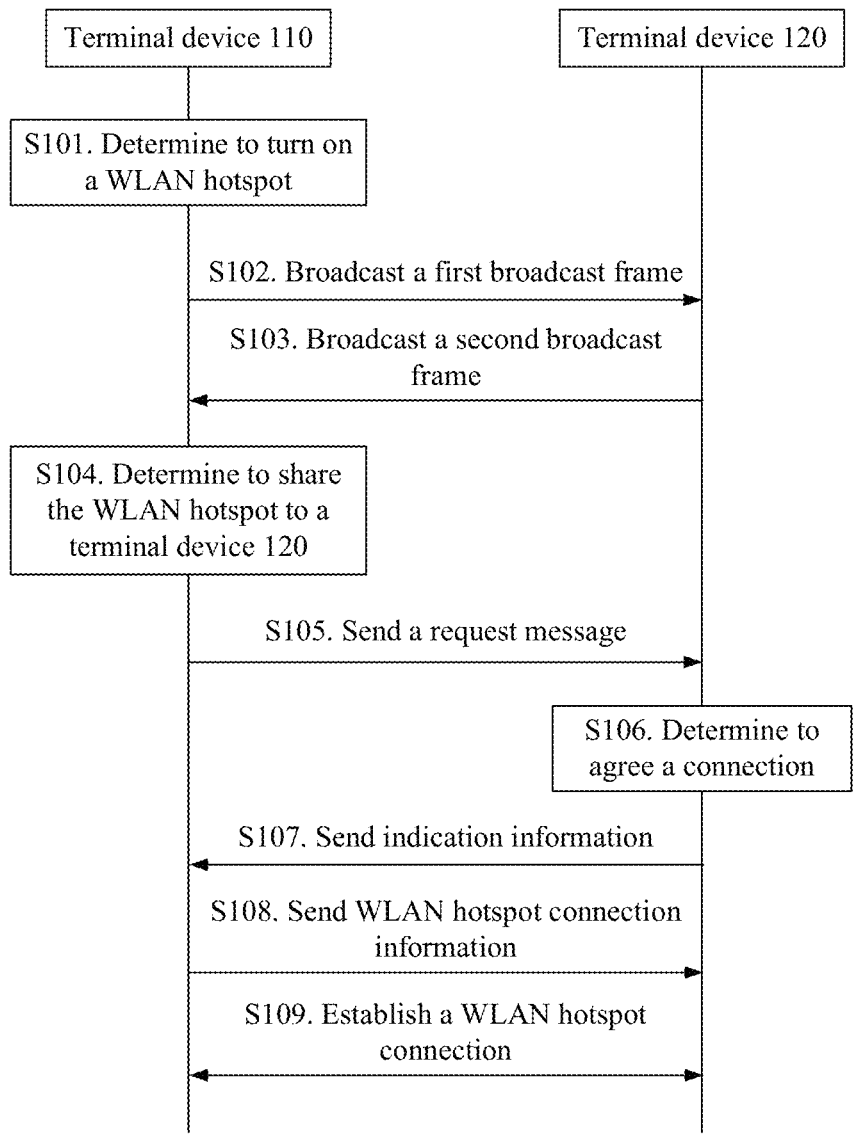
FIG. 9 is a schematic signaling interaction diagram of a method for establishing a hotspot connection according to an embodiment of the present invention.

It should be understood that for specific operation steps of background applications and/or hardware of the terminal devices in the method for establishing a hotspot connection shown in FIG. 1 to FIG. 8, refer to descriptions of a specific embodiment shown in FIG. 9.

According to the communications system and the method for establishing a hotspot connection provided in this embodiment of the present invention, the hotspot provider device proactively discovers the surrounding hotspot receiver device through broadcasting and scanning, and proactively sends the hotspot sharing request to the hotspot receiver device. After the hotspot receiver device feeds back information indicating that the hotspot receiver device agrees to connect to the hotspot, the hotspot receiver device can connect to the WLAN hotspot of the hotspot provider without entering a WLAN hotspot password.

According to the method for establishing a hotspot connection provided in this embodiment of the present invention, the following operations can be skipped: The terminal device 120 to be connected to the WLAN hotspot scans all surrounding WLAN hotspots, the user selects the terminal device 110 as the WLAN hotspot on the terminal device 120, the user enters the WLAN hotspot password of the terminal device 11 on the terminal device 120, and the like. This can simplify hotspot connection steps and improve efficiency of establishing a hotspot connection.

Further, this embodiment of the present invention can also resolve a problem that a hotspot receiver device without a big display screen or a keyboard cannot be connected to a WLAN hotspot of a surrounding terminal device, greatly improving user experience.

Correspondingly, FIG. 9 is a schematic signaling interaction diagram of a method for establishing a hotspot connection according to an embodiment of the present invention. As shown in FIG. 9, the method includes steps S101 to S109.

Step S101: A terminal device 110 determines to turn on a WLAN hotspot.

For example, if a user A enters an operation "turn on WLAN hotspot" on the terminal device 110, the terminal device 110 is triggered to instruct a Bluetooth module or a WLAN module to start broadcasting and scanning. For a specific operation manner, refer to FIG. 2.

Step S102: The terminal device 110 broadcasts a first broadcast frame.

For example, the first broadcast frame may be broadcast by using Wi-Fi, BR, or BLE. Correspondingly, the terminal device 110 may scan, by using Wi-Fi, BR, or BLE, a broadcast frame sent by another terminal device.

For example, the first broadcast frame may carry one or more of an identity (Identity, ID), a service universally unique identifier (Universally Unique Identifier, UUID), a Bluetooth device (Bluetooth Device, BD) address information, or a WLAN identifier or address information of the terminal device 110.

Step S103: A terminal device 120 receives the first broadcast frame, and broadcasts a second broadcast frame.

In a possible example, the terminal device 110 broadcasts the first broadcast frame. The first broadcast frame is used to instruct a terminal device detecting the first broadcast frame to broadcast the second broadcast frame when the terminal device can use the terminal device 110 as a WLAN hotspot. The terminal device 110 scans the second broadcast frame. The terminal device 110 determines, based on the second broadcast frame, a set of terminal devices that can use the terminal device 110 as the WLAN hotspot.

In a possible example, the terminal device 110 broadcasts the first broadcast frame. The first broadcast frame is used to instruct a terminal device detecting the first broadcast frame to broadcast the second broadcast frame. The second broadcast frame carries indication information indicating whether the terminal device detecting the first broadcast frame can use the terminal device 110 as the WLAN hotspot. The terminal device 110 scans the second broadcast frame. The terminal device 110 determines, based on the second broadcast frame, a set of terminal devices that can use the terminal device 110 as the WLAN hotspot.

For example, the second broadcast frame may carry one or more of an ID, a service ID, and a BD address of the terminal device 120.

In a possible example, when the terminal device 110 and the terminal device 120 perform wireless communication in a manner of BR or BLE broadcast and scanning, the terminal device that receives the first broadcast frame broadcasts the second broadcast frame. The second broadcast frame further carries first information, and the first information is used to indicate whether the terminal device 120 can be connected to the WLAN hotspot. After detecting the second broadcast frame, the terminal device 110 may determine, based on the first information, to display a terminal device that can be connected to the WLAN hotspot in a list of terminal devices that are to share the WLAN hotspot.

For example, after detecting the first broadcast frame, the terminal device 120 broadcasts the second broadcast frame. The second broadcast frame carries the first information indicating whether the terminal device 120 can establish a communication connection to the terminal device 110 by using the terminal device 110 as the WLAN hotspot.

In a possible example, when the terminal device 110 and the terminal device 120 perform wireless communication in a manner of BR or BLE broadcast and scanning, the first broadcast frame may further carry second information. For example, the second information may instruct the terminal device that receives the first broadcast frame to determine whether the terminal device can be connected to the WLAN hotspot. When the terminal device can be connected to the WLAN hotspot, the terminal device broadcasts the second broadcast frame. After detecting the second broadcast frame, the terminal device 110 displays the corresponding terminal device in the list of terminal devices that are to share the WLAN hotspot. In a possible example, the first broadcast frame is a preset broadcast frame between the terminal devices. After detecting the first broadcast frame, the terminal device determines whether the terminal device can be connected to the WLAN hotspot. When the terminal device can be connected to the WLAN hotspot, the terminal device broadcasts the second broadcast frame. After detecting the second broadcast frame, the terminal device 110 displays the corresponding terminal device in the list of terminal devices that are to share the WLAN hotspot.

For example, after detecting the first broadcast frame, if the terminal device 120 determines that the terminal device 120 can establish a communication connection to the terminal device 110 by using the terminal device 110 as the WLAN hotspot, the terminal device 120 broadcasts the second broadcast frame.

In a possible example, when the terminal device 110 and the terminal device 120 perform wireless communication in a manner of Wi-Fi broadcast and scanning, the second broadcast frame broadcast by the terminal device 120 may carry a WLAN identifier or address information of the terminal device 120. For example, the terminal device 110 may determine, based on the WLAN identifier or address information of the terminal device 120 carried in the second broadcast frame, whether the terminal device 120 can use the terminal device 110 as the WLAN hotspot. Correspondingly, the first broadcast frame may not carry the second information, or the second broadcast frame may not carry the first information.

In a possible embodiment, the first broadcast frame broadcast by the terminal device 110 and the second broadcast frame broadcast by the terminal device 120 have different functions. The first broadcast frame is used to trigger the terminal device that receives the first broadcast frame to perform broadcasting, that is, used to discover another terminal device. The second broadcast frame is used to instruct the terminal device that receives the second broadcast frame to exchange information with the terminal device 120, that is, used to make the another terminal device discover the terminal device 120. After receiving the first broadcast frame broadcast by the terminal device 110, the another terminal device broadcasts the second broadcast frame, so that the another terminal device can be discovered by the terminal device 110. It should be noted that, after receiving the second broadcast frame broadcast by the terminal device 120, the another terminal device can discover the terminal device 120. The terminal device may implement broadcasting in a Wi-Fi manner, a BR manner, a BLE manner, or another broadcast manner.

It should be understood that in this embodiment of the present invention, after receiving the first broadcast frame, the hotspot receiver device sends the second broadcast frame, to instruct the hotspot provider device that receives the second broadcast frame to exchange information with the hotspot receiver device. This avoids that the hotspot receiver device keeps broadcasting, and can reduce power consumption of the hotspot receiver device.

Step S104: The terminal device 110 determines to share the WLAN hotspot to the terminal device 120.

For example, the terminal device 110 detects second broadcast frames broadcast by a plurality of terminal devices, and determines, based on the second broadcast frames broadcast by the plurality of terminal devices, a set of surrounding terminal devices that can use the terminal device 110 as the WLAN hotspot. Correspondingly, the set of terminal devices set is a set of devices that can receive the WLAN hotspot of the terminal device 110. The terminal device 110 may display, by using a display screen, an identifier of at least one terminal device included in the set of terminal devices. For details, refer to FIG. 3.

In a possible example, the terminal device 110 may receive an operation entered by a user, to determine to share the WLAN hotspot to which terminal devices in the set of terminal devices. For example, the terminal device 120 may display the identifier of the at least one terminal device included in the set of terminal devices. The user may enter an operation instruction on the terminal device 110 based on the identifier of the at least one terminal device, to instruct the terminal device 110 to send a request message to the terminal device 120. For a specific operation manner, refer to FIG. 4.

Step S105: The terminal device 110 sends a request message to the terminal device 120.

The request message is used to request that the terminal device 110 be used as the WLAN hotspot of the terminal device 120.

For example, the terminal device 110 may send the request message to the terminal device 120 in a BLE or classic Bluetooth connection manner. In addition, the terminal device 110 may alternatively send the request message to the terminal device 120 in a Wi-Fi, BR, or BLE broadcast manner. A wireless communication manner is not limited in this embodiment of the present invention.

Step S106: The terminal device 120 determines to agree to connect to the WLAN hotspot shared by the terminal device 110.

Specifically, the terminal device 120 confirms that the terminal device 120 agrees to connect to the WLAN hotspot shared by the terminal device 110. In other words, the terminal device 120 confirms that the terminal device 120 agrees to use the terminal device 110 as the WLAN hotspot of the terminal device 120.

For example, the terminal device 120 receives the request message of the terminal device 110, and displays the request message by using a display screen. For details, refer to FIG. 5.

For example, if a user B enters an operation on the terminal device 120, to indicate that the terminal device confirms using the terminal device 110 as the WLAN hotspot of the terminal device 120. For a specific operation manner, refer to FIG. 6.

Step S107: The terminal device 120 sends indication information to the terminal device 110.

For example, the indication information is used to indicate that the terminal device 120 confirms using the terminal device 110 as the WLAN hotspot of the terminal device 120, that is, indicate that the terminal device 120 agrees to connect to the WLAN hotspot of the terminal device 110.

In a possible example, after receiving the hotspot sharing request sent by the terminal device 110, the terminal device 120 determines that the terminal device 120 has connected to the hotspot before, and the terminal device 120 directly sends the indication information to the terminal device 110 without waiting for an instruction "agree to connect" triggered by the user, indicating that the terminal device 120 agrees to connect to the WLAN hotspot of the terminal device 110.

Step S108: The terminal device 110 sends WLAN hotspot connection information to the terminal device 120.

The WLAN hotspot connection information may include at least one piece of information such as an identifier and a password that are of the WLAN hotspot. The identifier of the WLAN hotspot may be a name of the WLAN hotspot or may be Medium Access Control (Medium Access Control, MAC) address information of the WLAN hotspot.

In a possible example, the terminal device 120 has connected to the WLAN hotspot before. If the terminal device 120 has stored password information of the WLAN hotspot, the WLAN hotspot connection information includes the identifier of the WLAN hotspot.

In a possible example, the terminal device 120 has connected to the WLAN hotspot before. If the terminal device 120 has stored the identifier and the password information that are of the WLAN hotspot, the terminal device 110 skips performing step S108.

In a possible example, if the terminal device 120 has connected to the WLAN hotspot before, the terminal device 110 may be directly open to the terminal device 120, and the terminal device 110 skips performing step S108.

In a possible example, the terminal device 110 may add the WLAN hotspot connection information to the request message while sending the request message to the terminal device 120. When determining to accept the hotspot sharing request of the terminal device 110, the terminal device 120 may directly connect to the WLAN hotspot of the terminal device 110 based on the WLAN hotspot connection information carried in the request message, further simplifying steps for establishing the hotspot connection. A person skilled in the art may perform designing depending on an actual requirement, and no limitation is imposed in this embodiment of the present invention.

For example, before performing step S108, step S105, or the like, the terminal device 110 performs encryption on a channel on which wireless communication is performed between the terminal device 110 and the terminal device 120, so that only the terminal device 120 can correctly receive information sent by the terminal device 110. This ensures security of wireless communication.

Step S109: The terminal device 110 establishes a WLAN hotspot connection to the terminal device 120.

For example, the terminal device 120 may be connected to the Internet by using the WLAN hotspot of the terminal device 110.

In a possible example, the terminal device 120 is connected to the WLAN hotspot of the terminal device 110 based on the identifier and the password that are of the WLAN hotspot, to establish a communication connection to the terminal device 110 by using the terminal device 110 as the WLAN hotspot.

According to the method for establishing a hotspot connection provided in this embodiment of the present invention, hotspot connection steps of the hotspot receiver device, including complicated operations of searching, selecting, and entering a password, may be simplified as one confirming operation. This method provided in this embodiment is especially applicable to a terminal device without a keyboard or a big display screen.

Figure 10:
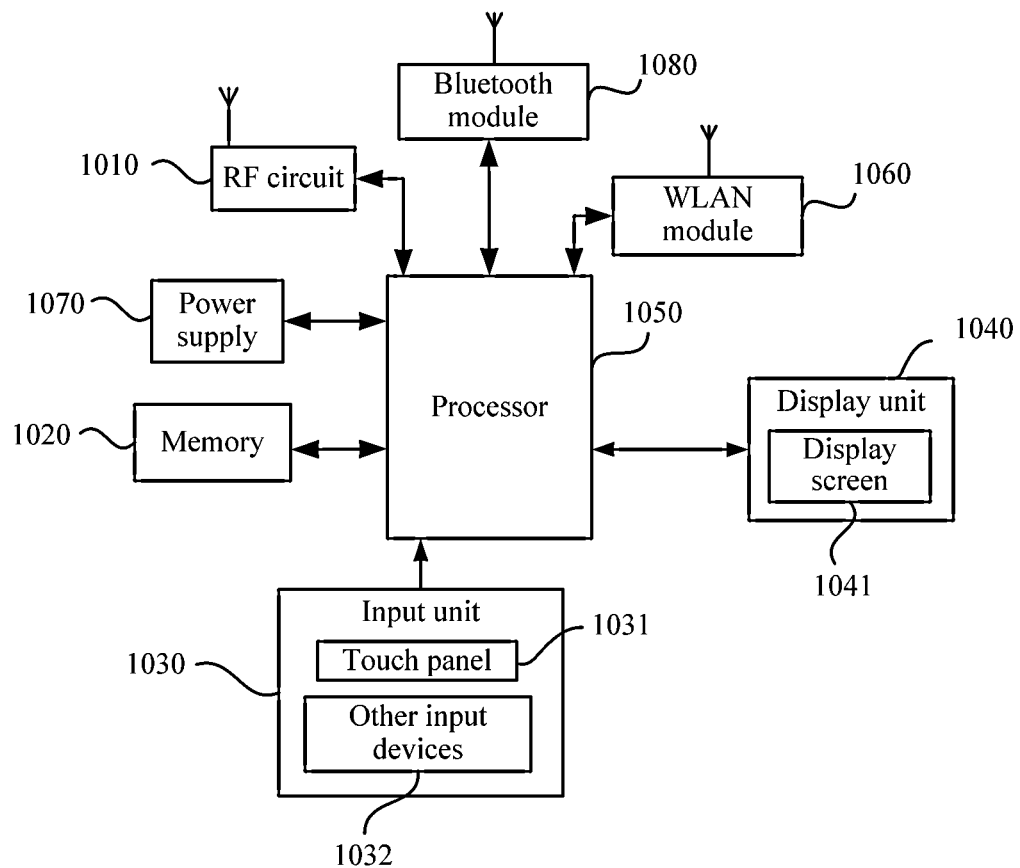
FIG. 10 is a schematic structural diagram of a terminal device according to an embodiment of the present invention.

Correspondingly, an embodiment of the present invention provides a terminal device, to implement the hotspot connection method provided in the foregoing embodiment. As shown in FIG. 10, the terminal device includes components such as a radio frequency (Radio Frequency, RF) circuit 1010, a memory 1020, an input unit 1030, a display unit 1040, a processor 1050, a WLAN module 1060, a power supply 1070, and a Bluetooth module 1080. A person skilled in the art may understand that a structure of the terminal device shown in FIG. 10 does not constitute a limitation on the terminal device, and the terminal device may include more or fewer components than those shown in the figure, or a combination of some components, or the components disposed differently.

The RF circuit 1010 may be configured to receive/send information, for example, connect to a mobile broadband to receive/send information. Usually, the RF circuit 1010 includes but is not limited to an antenna, at least one amplifier, a transceiver, a coupler, a low noise amplifier (Low Noise Amplifier, LNA), a duplexer, and the like. In addition, the RF circuit 1010 may further forward a mobile broadband service to the WLAN module 1060, so as to forward the mobile broadband service to another terminal device by using the WLAN module 1060. Any communication standard or protocol may be used for wireless communication, including but not limited to Global System for Mobile Communications (Global System of Mobile Communication, GSM), General Packet Radio Service (General Packet Radio Service, GPRS), Code Division Multiple Access (Code Division Multiple Access, CDMA), Wideband Code Division Multiple Access (Wideband Code Division Multiple Access, WCDMA), Long Term Evolution (Long Term Evolution, LTE), an email protocol, a short message service (Short Messaging Service, SMS) protocol, and the like.

The memory 1020 may be configured to store a program instruction, and the processor 1050 runs the program instruction stored in the memory 1020, so that the terminal performs the method for establishing a hotspot connection shown in FIG. 9. The memory 1020 may mainly include a program storage area and a data storage area. The program storage area may store an operating system and an application program required by the method for establishing a hotspot connection. The data storage area may store list information of the terminal device and data generated when the terminal device performs the method for establishing a hotspot connection. In addition, the memory 1020 may include a volatile memory (volatile memory), for example, a random-access memory (random-access memory, RAM). The memory 1020 may also include a non-volatile memory (non-volatile memory), for example, a read-only memory (read-only memory, ROM), a flash memory (flash memory), a hard disk drive (hard disk drive, HDD), or a solid-state drive (solid-state drive, SSD). The memory 1020 may also include a combination of the foregoing types of memories.

The input unit 1030 may be configured to receive numeral or character information entered by a user, including an instruction for turning on a WLAN hotspot, an instruction for selecting a terminal device sharing a WLAN hotspot, and the like. Specifically, the input unit 1030 may include a touch control panel 1031 and other input devices 1032. The touch control panel 1031, also referred to as a touchscreen, may collect a touch operation performed by a user on or near the touch control panel 1031 (for example, an operation performed by the user on or near the touch control panel 1031 by using a finger, a stylus, or any other proper object or accessory), and drive a corresponding connection apparatus according to a preset program. Optionally, the touch control panel 1031 may include two parts: a touch detection apparatus and a touch controller. The touch detection apparatus detects a touch position of the user, detects a signal brought by a touch operation, and transmits the signal to the touch controller. The touch controller receives touch information from the touch detection apparatus, converts the touch information into touchpoint coordinates, and sends the touchpoint coordinates to the processor 1050, and can receive a command sent by the processor 1050 and execute the command. In addition, the input unit 1030 may implement the touch control panel 1031 in use a plurality of types such as a resistive type, a capacitive type, an infrared type, and a surface acoustic wave type. In addition to the touch control panel 1031, the input unit 1030 may further include the other input devices 1032. Specifically, the other input devices 1032 may include but are not limited to one or more of a physical keyboard, a function key (such as a volume control key or a switch key), a trackball, a mouse, a joystick, and the like.

The display unit 1040 may be configured to display information entered by the user, information provided for the user, and various menus of the terminal device. The display unit 1040 may include a display screen 1041. Optionally, the display screen 1041 may be configured in a form such as a liquid crystal display (Liquid Crystal Display, LCD) or an organic light-emitting diode (Organic Light-Emitting Diode, OLED). Further, the touch control panel 1031 can cover the display screen 1041. After detecting the touch operation performed on or near the touch control panel 1031, the touch control panel 1031 transmits the touch operation to the processor 1050, so as to determine a type of a touch event; and then the processor 1050 provides corresponding vision output on the display screen 1041 based on the type of the touch event. Although the touch control panel 1031 and the display screen 1041 in FIG. 10 are used as two independent components to implement input and input functions of the terminal 100, in some embodiments, the touch control panel 1031 and the display screen 1041 may be integrated to implement the input and output functions of the terminal 100.

The processor 1050 is a control center of the terminal device, connects various parts of the entire terminal by using various interfaces and lines, and performs the method for establishing a hotspot connection shown in FIG. 9 by running or executing software programs and/or modules stored in the memory 1020 and invoking data stored in the memory 1020. Optionally, the processor 1050 may include one or more processing units. Preferably, an application processor and a modem processor may be integrated into the processor 1050. The application processor mainly processes an operating system, a user interface, an application program, and the like. The modem processor mainly handles wireless communication. It can be understood that the modem processor may alternatively not be integrated into the processor 1050.

The WLAN module 1060 may be configured to assist a user in receiving and sending an e-mail, browsing a web page, accessing a streaming media, and the like, and provides wireless broadband WLAN Internet access for the user. A WLAN is a short-range wireless transmission technology. The terminal device may connect to a WLAN hotspot by using the WLAN module 1060, or turn on the WLAN hotspot by using the WLAN module 1060, to forward the mobile broadband service to another terminal device. The WLAN module 1060 may also perform Wi-Fi broadcast and scanning to implement wireless communication with the another surrounding terminal device.

The terminal device further includes the power supply 1070 (for example, a battery) that supplies power to each component. Preferably, the power supply may be logically connected to the processor 1050 by using a power supply management system, so as to implement functions such as charge management, discharge management, and power consumption management by using the power supply management system.

The Bluetooth module 1070 may be a BLE device, a conventional Bluetooth device, or a dual-mode Bluetooth device supporting conventional Bluetooth and BLE. The Bluetooth module 1070 establishes a BLE or classic Bluetooth connection to a Bluetooth module of another terminal device. The Bluetooth module 1070 may also perform BR or BLE broadcast and scanning to implement wireless communication with the another surrounding terminal device.

Although not shown, the terminal device may further include a camera, a loudspeaker, and the like, and details are not described herein.

For example, the RF circuit 1010, the Bluetooth module 1080, and the WLAN module 1060 may be collectively referred to as a wireless communications interface.

In a possible embodiment, the terminal device provided in this embodiment may be referred to as a first terminal device. The memory 1020 of the first terminal device is configured to store a program instruction. The processor 1050 is configured to perform the following operations according to the program instruction stored in the memory 1020: instructing the wireless communications interface to send a request message to a second terminal device, where the request message is used to request that the first terminal device be used as a WLAN hotspot of the second terminal device; instructing the wireless communications interface to receive indication information from the second terminal device, where the indication information is used to indicate that the second terminal device confirms using the first terminal device as the WLAN hotspot of the second terminal device; and instructing the wireless communications interface to establish a communication connection to the second terminal device by using the first terminal device as the WLAN hotspot of the second terminal device. For example, the terminal device provided in this embodiment may send the request message to the second terminal device by using the Bluetooth module 1080 or the WLAN module 1060. The terminal device provided in this embodiment may establish the communication connection to the second terminal device by using the WLAN module 1060 as the WLAN hotspot of the second terminal device.

For example, the processor 1050 is further configured to perform the following operation according to the program instruction stored in the memory 1020: instructing the wireless communications interface to send WLAN hotspot connection information to the second terminal device, where the WLAN hotspot connection information is used by the second terminal device to establish the communication connection to the first terminal device by using the first terminal device as the WLAN hotspot.

For example, the terminal device provided in this embodiment may send the WLAN hotspot connection information to the second terminal device by using the Bluetooth module 1080 or the WLAN module 1060.

Optionally, the first terminal device may send the request message or the WLAN hotspot connection information to the second terminal device in a manner of establishing a BLE or classic Bluetooth connection by using the Bluetooth module 1080. In addition, the first terminal device may send the request message or the WLAN hotspot connection information to the second terminal device in a Wi-Fi broadcast manner by using the WLAN module 1060 or in a BR or BLE broadcast manner by using the Bluetooth module 1080.

For example, the processor 1050 is further configured to perform the following operation according to the program instruction stored in the memory 1020: instructing the input unit 1030 to receive a first operation instruction of a user, where the first operation instruction is used to instruct the processor 1050 to turn on the WLAN hotspot. The input unit 1030 is further configured to receive a second operation instruction of the user, where the second operation instruction is used to instruct the processor 1050 to control the wireless communications interface to send the request message to the second terminal device.

Optionally, the processor 1050 may turn on the WLAN hotspot by controlling the WLAN module 1060, to create an identifier and a password that are of the WLAN hotspot.

For example, the processor 1050 is configured to determine a set of terminal devices that can use the first terminal device as the WLAN hotspot. The set of terminal devices includes the second terminal device.

Optionally, the processor 1050 may instruct the Bluetooth module 1080 to determine, in a manner of BR or BLE broadcast and scanning, the set of surrounding terminal devices that can use the first terminal device as the WLAN hotspot, or instruct the WLAN module 1060 to determine, in a manner of Wi-Fi broadcast and scanning, the set of surrounding terminal devices that can use the first terminal device as the WLAN hotspot.

Optionally, the processor 1050 is further configured to perform the following operation according to the program instruction stored in the memory 1020: instructing the display unit 1040 to display an identifier of at least one terminal device included in the set of terminal devices, so that the user enters the second operation instruction on the input unit 1030 based on the identifier of the at least one terminal device.

For example, the processor 1050 is further configured to perform the following operations according to the program instruction stored in the memory 1020: instructing the wireless communications interface to broadcast a first broadcast frame, where the first broadcast frame is used to instruct a terminal device detecting the first broadcast frame to broadcast a second broadcast frame when the terminal device can use the first terminal device as the WLAN hotspot; and scanning the second broadcast frame. The processor 1050 is configured to determine, based on the second broadcast frame, the set of terminal devices that can use the first terminal device as the WLAN hotspot.

For example, the processor 1050 is further configured to perform the following operations according to the program instruction stored in the memory 1020: instructing the wireless communications interface to broadcast a first broadcast frame, where the first broadcast frame is used to instruct a terminal device detecting the first broadcast frame to broadcast a second broadcast frame, where the second broadcast frame carries indication information indicating whether the terminal device detecting the first broadcast frame can use the first terminal device as the WLAN hotspot; and scanning the second broadcast frame. The processor 1050 is configured to determine, based on the second broadcast frame, the set of terminal devices that can use the first terminal device as the WLAN hotspot.

For example, the wireless communications interface is specifically configured to broadcast the first broadcast frame based on a BR technology or broadcast the first broadcast frame based on a BLE technology. The BR technology or the BLE technology may be implemented by using the Bluetooth module 1080.

Figure 11:
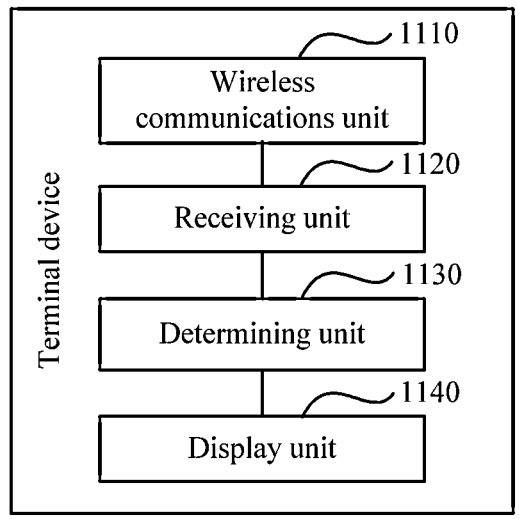
FIG. 11 is a schematic structural diagram of another terminal device according to an embodiment of the present invention.

In addition, the terminal device provided in this embodiment of the present invention may also use the following manner to implement the method for establishing a hotspot connection in the foregoing embodiment of the present invention. As shown in FIG. 11, the terminal device includes a wireless communications unit 1110, a receiving unit 1120, a determining unit 1130, and a display unit 1140.

In a possible embodiment, the terminal device provided in this embodiment may be referred to as a first terminal device. The wireless communications unit 1110 of the first terminal device provided in this embodiment is configured to send a request message to a second terminal device. The request message is used to request that the first terminal device be used as a WLAN hotspot of the second terminal device. The wireless communications unit 1110 is further configured to receive indication information from the second terminal device. The indication information is used to indicate that the second terminal device confirms using the first terminal device as the WLAN hotspot of the second terminal device. The wireless communications unit 1110 is further configured to establish a communication connection to the second terminal device by using the first terminal device as the WLAN hotspot of the second terminal device.

In an optional embodiment, the wireless communications interface in the embodiment in FIG. 10 may be implemented by using the wireless communications unit 1110, the input unit 1030 may be implemented by using the receiving unit 1120, the processor 1050 may be implemented by using the determining unit 1130, and the display unit 1040 may be implemented by using the display unit 1140.

For processing procedures of the units in FIG. 11, refer to the specific embodiments shown in FIG. 9 and FIG. 10, and details are not described herein again.

Figure 12:
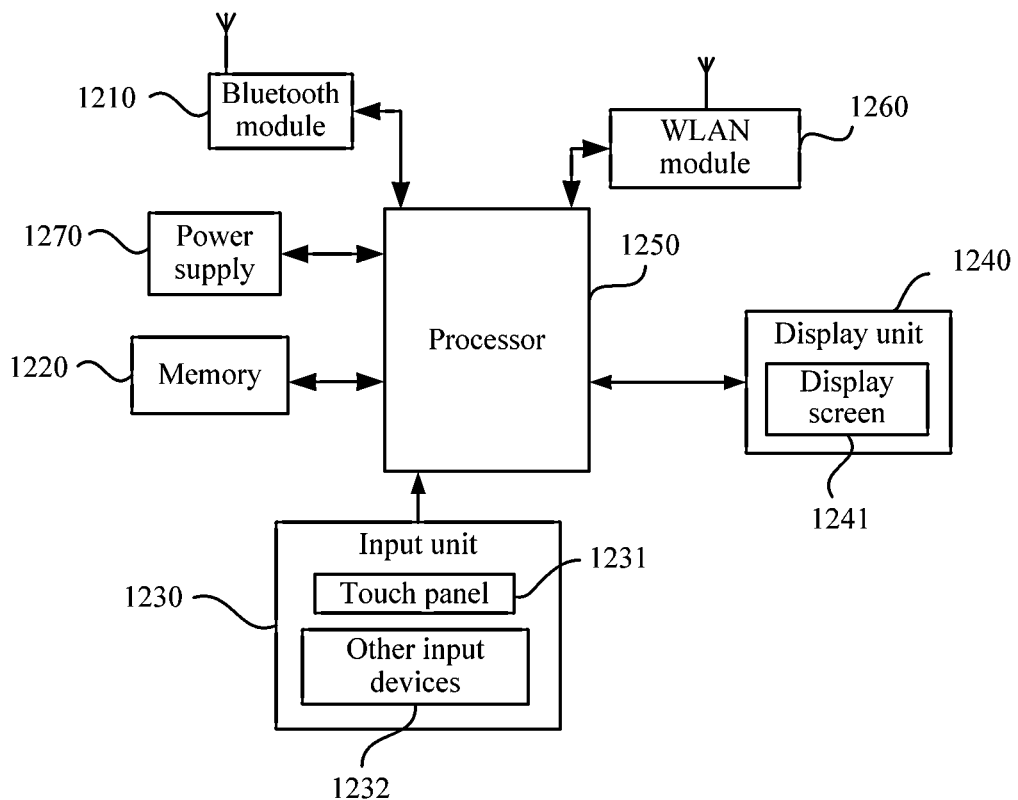
FIG. 12 is a schematic structural diagram of still another terminal device according to an embodiment of the present invention.

Correspondingly, an embodiment of the present invention provides another terminal device, to implement the hotspot connection method provided in the foregoing embodiment. As shown in FIG. 12, the terminal device includes components such as a Bluetooth module 1210, a memory 1220, an input unit 1230, a display unit 1240, a processor 1250, a WLAN module 1260, and a power supply 1270. A person skilled in the art may understand that a structure of the terminal device shown in FIG. 12 does not constitute a limitation on the terminal device, and the terminal device may include more or fewer components than those shown in the figure, or a combination of some components, or the components disposed differently.

For a connection relationship between the parts and functions of the parts, refer to descriptions in FIG. 10, and details are not described herein again.

For example, the Bluetooth module 1210 and the WLAN module 1260 may be collectively referred to as a wireless communications interface.

In a possible embodiment, the terminal device provided in this embodiment may be referred to as a first terminal device. The memory 1220 of the first terminal device is configured to store a program instruction. The processor 1250 is configured to perform the following operations according to the program instruction stored in the memory 1220: instructing the wireless communications interface to receive a request message from a second terminal device, where the request message is used to request that the second terminal device be used as a WLAN hotspot of the first terminal device; instructing the wireless communications interface to send indication information to the second terminal device, where the indication information is used to indicate that the first terminal device confirms using the second terminal device as the WLAN hotspot of the first terminal device; and instructing the wireless communications interface to establish a communication connection to the second terminal device by using the second terminal device as the WLAN hotspot of the first terminal device.

For example, the processor 1250 is further configured to perform the following operations according to the program instruction stored in the memory 1220: instructing the wireless communications interface to receive WLAN hotspot connection information from the second terminal device; and instructing the wireless communications interface to establish a communication connection to the second terminal device based on the WLAN hotspot connection information by using the second terminal device as the WLAN hotspot of the first terminal device.

For example, the terminal device provided in this embodiment may receive the request message from the second terminal device and send an indication message to the second terminal device by using the Bluetooth module 1210 or the WLAN module 1260. The terminal device provided in this embodiment may establish, by using the WLAN module 1260, the communication connection to the second terminal device by using the second terminal device as the WLAN hotspot of the first terminal device.

Optionally, in a manner of establishing a BLE or classic Bluetooth connection by using the Bluetooth module 1210, the first terminal device may receive the request message from the second terminal device and send the indication message to the second terminal device. Alternatively, in a manner of performing Wi-Fi broadcast and scanning by using the WLAN module 1260 or in a manner of performing BR or BLE broadcast and scanning by using the Bluetooth module 1280, the first terminal device may receive the request message from the second terminal device and send the indication message to the second terminal device.

For example, the processor 1250 is further configured to perform the following operations according to the program instruction stored in the memory 1220: instructing the display unit 1240 to display the request message of the second terminal device; and instructing the input unit 1230 to receive a first operation instruction of a user, where the first operation instruction is used to instruct the processor 1250 to control the wireless communications interface to send the indication information to the second terminal device.

For example, the processor 1250 is further configured to perform the following operations according to the program instruction stored in the memory 1220: instructing the wireless communications interface to scan a first broadcast frame from the second terminal device, where the first broadcast frame is used to instruct a terminal device detecting the first broadcast frame to broadcast a second broadcast frame when the terminal device can use the second terminal device as the WLAN hotspot; determining that the first terminal device can use the second terminal device as the WLAN hotspot; and instructing the wireless communications interface to broadcast the second broadcast frame.

For example, the processor 1250 is further configured to perform the following operations according to the program instruction stored in the memory 1220: instructing the wireless communications interface to scan a first broadcast frame from the second terminal device, where the first broadcast frame is used to instruct a terminal device detecting the first broadcast frame to broadcast a second broadcast frame, and the second broadcast frame carries indication information indicating whether the terminal device detecting the first broadcast frame can use the second terminal device as the WLAN hotspot; and instructing the wireless communications interface to broadcast the second broadcast frame, where the second broadcast frame carries indication information indicating whether the first terminal device can use the second terminal device as the WLAN hotspot.

For example, the processor 1250 is specifically configured to perform the following operation according to the program instruction stored in the memory 1220: instructing the wireless communications interface to broadcast the first broadcast frame based on a BR technology or broadcast the first broadcast frame based on a BLE technology. The BR technology or the BLE technology may be implemented by using the Bluetooth module 1210.

Figure 13:
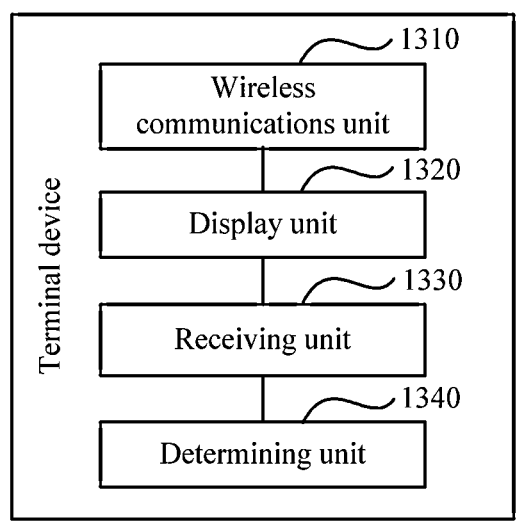
FIG. 13 is a schematic structural diagram of yet another terminal device according to an embodiment of the present invention.

In addition, the terminal device provided in this embodiment of the present invention may also use the following manner to implement the method for establishing a hotspot connection in the foregoing embodiment of the present invention. As shown in FIG. 13, the terminal device includes a wireless communications unit 1310, a display unit 1320, a receiving unit 1330, and a determining unit 1340.

In a possible embodiment, the wireless communications unit 1310 of the terminal device provided in this embodiment is configured to receive a request message from a second terminal device. The request message is used to request that the second terminal device be used as a WLAN hotspot of the first terminal device. The wireless communications unit 1310 is further configured to send indication information to the second terminal device. The indication information is used to indicate that the first terminal device confirms using the second terminal device as the WLAN hotspot of the first terminal device. The wireless communications unit 1310 is further configured to establish a communication connection to the second terminal device by using the second terminal device as the WLAN hotspot of the first terminal device.

In an optional embodiment, the wireless communications interface in the embodiment in FIG. 12 may be implemented by using the wireless communications unit 1310, the input unit 1230 may be implemented by using the receiving unit 1330, the processor 1250 may be implemented by using the determining unit 1340, and the display unit 1240 may be implemented by using the display unit 1320.

For processing procedures of the units in FIG. 13, refer to the specific embodiments shown in FIG. 9 and FIG. 12, and details are not described herein again.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraints of the technical solutions. A person skilled in the art may use different methods to implement the described functions for each particular application, but it should not be considered that the implementation goes beyond the scope of this application.

A person of ordinary skill in the art may understand that all or a part of the steps in each of the foregoing method of the embodiments may be implemented by a program instructing a processor. The foregoing program may be stored in a computer readable storage medium. The storage medium may be a non-transitory (non-transitory) medium, such as a random-access memory, a read-only memory, a flash memory, a hard disk, a solid state drive, a magnetic tape (magnetic tape), a floppy disk (floppy disk), an optical disc (optical disc), or any combination thereof.

The foregoing descriptions are merely example specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for establishing a hotspot connection, comprising:

receiving, by a first terminal device, a first operation, wherein the first operation allows one or more other devices to use mobile data of the first terminal device;

broadcasting, by the first terminal device, a first broadcast frame, wherein the first broadcast frame is used to detect a second terminal device capable of being connected to the first terminal device and using a wireless local area network (WLAN) hotspot of the first terminal device, and the first broadcast frame instructs the second terminal device to broadcast a second broadcast frame in response to determining the second terminal device is capable of being connected to the first terminal device and using the WLAN hotspot of the first terminal device based on the first broadcast frame;

receiving, by the first terminal device, the second broadcast frame from the second terminal device, wherein the second broadcast frame comprises information indicating the second terminal device is capable of being connected to the first terminal device and using the WLAN hotspot of the first terminal device;

determining, by the first terminal device, to share the WLAN hotspot with the second terminal device based on the received second broadcast frame;

in response to determining to share the WLAN hotspot with the second terminal based on the received second broadcast frame, requesting, by the first terminal device, that the second terminal device use the first terminal device as a hotspot and sending, by the first terminal device, WLAN hotspot connection information for using the first terminal device as the hotspot, the WLAN hotspot connection information being sent directly to the second terminal device by way of a Bluetooth low energy (BLE) channel, wherein the WLAN hotspot connection information comprises a password for accessing the WLAN hotspot;

establishing, by the second terminal device, a WLAN hotspot communication connection to the first terminal device by directly using the WLAN hotspot connection information without the password for accessing the WLAN hotspot being inputted into the second terminal device; and connecting, by the second terminal device, to the Internet by using the WLAN hotspot of the first terminal device.

2. A terminal device, wherein the terminal device is a first terminal device, and the first terminal device comprises a memory, a processor, an input unit, and a wireless communications interface, wherein the memory is configured to store a program instruction; and when the program instruction is processed by the processor, the first terminal device is caused to perform the steps of:

receiving a first operation, wherein the first operation allows one or more other devices to use mobile data of the first terminal device;

broadcasting a first broadcast frame, wherein the first broadcast frame is used to detect a second terminal device capable of being connected to the first terminal device and using a wireless local area network (WLAN) hotspot of the first terminal device, and the first broadcast frame instructs the second terminal device to broadcast a second broadcast frame in response to determining the second terminal device is capable of being connected to the first terminal device and using the WLAN hotspot of the first terminal device based on the first broadcast frame;

receiving the second broadcast frame from the second terminal device, wherein the second broadcast frame comprises information indicating the second terminal device is capable of being connected to the first terminal device and using the WLAN hotspot of the first terminal device;

determining to share the WLAN hotspot with the second terminal device based on the received second broadcast frame;

in response to determining to share the WLAN hotspot with the second terminal based on the received second broadcast frame, requesting that the second terminal device use the first terminal device as a hotspot and sending WLAN hotspot connection information for using the first terminal device as the hotspot, the WLAN hotspot connection information being sent directly to the second terminal device by way of a Bluetooth low energy (BLE) channel, wherein WLAN hotspot connection information comprises a password for accessing the WLAN hotspot;

establishing a WLAN hotspot connection to the second terminal device by directly using the WLAN hotspot connection information without the password for accessing the WLAN hotspot being inputted into the second terminal device; and connecting the second terminal device to the Internet by using the WLAN hotspot of the first terminal device.

3. The terminal device according to claim 2, wherein the first terminal device further comprises a display unit, and before sending the WLAN hotspot connection information to the second terminal device, the first terminal device is further caused to perform:

displaying a first notification by using a display screen, wherein the first notification comprises a first option.

4. The terminal device according to claim 3, wherein the requesting that the second terminal device use the first terminal device as the hotspot comprises:

sending a request message to the second terminal device, wherein the request message is used to request that the first terminal device be used as the WLAN hotspot of the second terminal device; and receiving indication information from the second terminal device, wherein the indication information is used to indicate that the second terminal device confirms using the first terminal device as the WLAN hotspot.

5. The terminal device according to claim 4, wherein before the receiving the indication information from the second terminal device, the first terminal device is further caused to perform:

causing the second terminal device to display a second notification by using a display screen based on the request message to facilitate the indication information being sent by the second terminal device based on an interaction with the second notification indicative of an acceptance to connect to the Internet by way of the WLAN hotspot of the first terminal device.

6. The terminal device according to claim 3, wherein the sending the WLAN hotspot connection information for using the first terminal device as a hotspot comprises:

receiving a second operation on the first option; and sending the WLAN hotspot connection information by way of the BLE channel.

7. The method according to claim 1, wherein before the sending, by the first terminal device, the WLAN hotspot connection information, the method further comprises:
- displaying, by the first terminal device, a first notification by using a display screen, wherein the first notification comprises a first option.

8. The method according to claim 7, wherein the requesting that the second terminal device use the first terminal device as the hotspot comprises:
- sending, by the first terminal device, a request message to the second terminal device, wherein the request message is used to request that the first terminal device be used as the WLAN hotspot of the second terminal device; and
- sending, by the second terminal device, indication information to the first terminal device, wherein the indication information is used to indicate that the second terminal device confirms using the first terminal device as the WLAN hotspot by the second terminal device.

9. The method according to claim 8, wherein before the sending, by the second terminal device, the indication information to the first terminal device, the method further comprises:
- displaying, by the second terminal device, a second notification by using a display screen, wherein the indication information is sent by the second terminal device based on an interaction with the second notification indicative of an acceptance to connect to the Internet by way of the WLAN hotspot of the first terminal device.

10. The method according to claim 7, wherein the sending, by the first terminal device, the WLAN hotspot connection information for using the first terminal device as a hotspot comprises:
- receiving, by the first terminal device, a second operation on the first option; and
- sending, by the first terminal device, the WLAN hotspot connection information by way of the BLE channel.

11. The method according to claim 1, wherein the WLAN hotspot connection information is sent only to the second terminal device by the first terminal device in response to determining, by the first terminal device, to share the WLAN hotspot with the second terminal device based on the received broadcast frame.

12. The method according to claim 11, further comprising:
- encrypting, by the first terminal device, the BLE channel before sending the WLAN hotspot connection information to facilitate sending the WLAN hotspot connection information only to the second terminal device.

13. The method according to claim 1, further comprising:
- encrypting, by the first terminal device, the BLE channel before sending the WLAN hotspot connection information to facilitate sending the WLAN hotspot connection information directly to the second terminal device.

14. The terminal device according to claim 2, wherein the WLAN hotspot connection information is sent only to the second terminal device by the first terminal device in response to determining, by the first terminal device, to share the WLAN hotspot with the second terminal device based on the received broadcast frame.

15. The terminal device according to claim 14, wherein the first terminal device is further caused to perform:
- encrypting, by the first terminal device, the BLE channel before sending the WLAN hotspot connection information to facilitate sending the WLAN hotspot connection information only to the second terminal device.

16. The terminal device according to claim 2, wherein the first terminal device is further caused to perform:
- encrypting, by the first terminal device, the BLE channel before sending the WLAN hotspot connection information to facilitate sending the WLAN hotspot connection information directly to the second terminal device.

* * * * *